(12) United States Patent
Yu et al.

(10) Patent No.: US 12,494,648 B2
(45) Date of Patent: Dec. 9, 2025

(54) CONTROL METHOD OF ENERGY STORAGE APPARATUS, ENERGY STORAGE APPARATUS, AND PHOTOVOLTAIC POWER GENERATION SYSTEM

(71) Applicant: Huawei Digital Power Technologies Co., Ltd., Shenzhen (CN)

(72) Inventors: Shijiang Yu, Shanghai (CN); Jianshan Li, Shanghai (CN); Chunlei Zhang, Dongguan (CN); Zhipeng Wu, Shenzhen (CN); Lei Shi, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 112 days.

(21) Appl. No.: 18/477,563

(22) Filed: Sep. 29, 2023

(65) Prior Publication Data
US 2024/0022077 A1    Jan. 18, 2024

Related U.S. Application Data

(63) Continuation of application No. PCT/CN2021/084104, filed on Mar. 30, 2021.

(51) Int. Cl.
*H02J 3/32* (2006.01)
*H02J 3/38* (2006.01)
*H02J 9/06* (2006.01)

(52) U.S. Cl.
CPC ............ *H02J 3/32* (2013.01); *H02J 3/38* (2013.01); *H02J 9/06* (2013.01); *H02J 2300/24* (2020.01)

(58) Field of Classification Search
CPC ........ H02J 3/32; H02J 3/38; H02J 9/06; H02J 2300/24
(Continued)

(56) References Cited

U.S. PATENT DOCUMENTS

| 2003/0047209 A1 | 3/2003 | Yanai et al. |
| 2015/0200559 A1 | 7/2015 | Im |

(Continued)

FOREIGN PATENT DOCUMENTS

| CN | 205489553 U | 8/2016 |
| CN | 112186878 A | 1/2021 |
| WO | 2012049911 A1 | 4/2012 |

*Primary Examiner* — Michael R. Fin
(74) *Attorney, Agent, or Firm* — Slater Matsil, LLP

(57) ABSTRACT

An energy storage apparatus, including a plurality of battery modules, a switch unit, a start unit; and an electrical energy output port. The energy storage apparatus is configured for use in a photovoltaic power generation system having a plurality of photovoltaic modules, a direct current-to-direct current (DC/DC) converter, and a direct current-to-alternating current (DC/AC) converter. The plurality of battery modules is separately connected to the start unit and the switch unit, and the plurality of battery modules are configured to, when the start unit receives a start signal, control the switch unit to be turned on. The energy storage apparatus is configured to, in response to the switch unit being turned on, output electrical energy of the plurality of battery modules through the electrical energy output port, and, in response to the switch unit being turned off, disconnect the plurality of battery modules from the electrical energy output port.

20 Claims, 9 Drawing Sheets

(58) Field of Classification Search
USPC .......................................................... 307/65
See application file for complete search history.

(56) References Cited

U.S. PATENT DOCUMENTS

| | | | |
|---|---|---|---|
| 2018/0131226 A1* | 5/2018 | Narla | H02S 40/38 |
| 2020/0336003 A1* | 10/2020 | Narla | H02J 9/062 |
| 2021/0126466 A1* | 4/2021 | Bozchalui | H02J 7/35 |
| 2021/0249860 A1* | 8/2021 | Moore | H02J 3/388 |
| 2022/0121260 A1* | 4/2022 | King | H02J 3/381 |

* cited by examiner

US 12,494,648 B2

CONTROL METHOD OF ENERGY STORAGE APPARATUS, ENERGY STORAGE APPARATUS, AND PHOTOVOLTAIC POWER GENERATION SYSTEM

CROSS-REFERENCE TO RELATED APPLICATIONS

This application is a continuation of International Application No. PCT/CN2021/084104, filed on Mar. 30, 2021, the disclosure of which is hereby incorporated by reference in its entirety.

TECHNICAL FIELD

This application relates to the field of black start technologies, and specifically, to a control method of an energy storage apparatus, an energy storage apparatus, and a photovoltaic power generation system.

BACKGROUND

As global investment in new energy increases, how to better use the new energy becomes more important. In addition, power supply stability of a new energy power generation system also becomes more important. An energy storage apparatus may store surplus electrical energy when an energy yield of the new energy power generation system exceeds a power consumption requirement of an electrical device, and provide the stored electrical energy for the electrical device when the energy yield of the new energy power generation system is less than the power consumption requirement of the electrical device, to implement power supply stability of the new energy power generation system. Therefore, the energy storage apparatus is widely used in the new energy power generation system.

An off-grid system is a common photovoltaic power generation system in which an energy storage apparatus needs to be configured. Electrical energy generated by the photovoltaic power generation system may be output to a power grid or may be directly provided for the electrical device. When the electrical device or a power grid is powered off, the off-grid system is automatically disconnected from the power grid or the electrical device. If a black start is to be implemented, a connection between the off-grid system and the electrical device needs to be resumed. In a common black start manner, an auxiliary power supply apparatus is configured in the off-grid system, and is configured to supply power to a controller in the off-grid system when the electrical device is powered off. After the controller is powered on, the off-grid system may be connected to the power grid, to resume power supply to the electrical device. However, in this start manner, a new component needs to be configured in the off-grid system, thereby increasing system costs.

SUMMARY

This application provides a control method of an energy storage apparatus, an energy storage apparatus, and a photovoltaic power generation system, to provide a new structure of an energy storage apparatus, so that when an electrical device or a power grid is powered off, a black start can be implemented without adding an additional component.

According to a first aspect, an embodiment of this application provides an energy storage apparatus. The energy storage apparatus is used in a photovoltaic power generation system. The photovoltaic power generation system includes a plurality of photovoltaic modules, a direct current-to-direct current converter (DC/DC converter), a direct current-to-alternating current converter (DC/AC converter), an energy storage apparatus, and a controller. In the structure of the photovoltaic power generation system, the energy storage apparatus may include a plurality of battery modules, a switch unit, a start unit, and an electrical energy output port. The electrical energy output port is connected to the controller.

The plurality of battery modules are separately connected to the start unit and the switch unit. The plurality of battery modules are configured to when the start unit receives a start signal, control the switch unit to be turned on. The switch unit is connected to the electrical energy output port. When the switch unit is turned on, electrical energy stored in the plurality of battery modules is output through the electrical energy output poll. When the switch unit is turned off, the plurality of battery modules are disconnected from the electrical energy output port.

According to the foregoing structure of the energy storage apparatus, when an electrical device or a power grid connected to the photovoltaic power generation system is powered off, the start signal may be sent to the start unit to control the switch unit to be turned on, and a closed path is formed for the electrical energy output port and the plurality of battery modules, so that the electrical energy stored in the plurality of battery modules is output to the controller through the electrical energy output port. After being powered on, the controller may control the photovoltaic power generation system to be connected to the electrical device or the power grid. The electrical energy generated by the photovoltaic power generation system is supplied to the electrical device or the power grid. In this way, the black start is implemented without adding an additional component.

In a possible design, each of the plurality of battery modules includes a battery pack, an auxiliary power supply, and a first switch.

A first end of the auxiliary power supply is connected to a first electrode of the first switch, and a second end of the auxiliary power supply is connected to a second end of the battery pack. The first electrode of the first switch is connected to the start unit, a second electrode of the first switch is separately connected to a first end of the battery pack and the start unit, and a control electrode of the first switch is connected to the auxiliary power supply. The first switch and the switch unit are coupled switches.

According to the foregoing structure of the energy storage apparatus, when the start unit receives the start signal, the auxiliary power supply may be connected to the battery pack through the start unit. After being powered on, the auxiliary power supply sends a control signal to the first switch to turn on the first switch. Because the first switch and the switch unit are coupled switches, when the first switch is turned on, the switch unit is also turned on, to form an electrical energy transmission path of the battery pack, so that electrical energy stored in the battery pack is output to the controller. The controller controls to implement the black start.

In a possible design, each battery module further includes a battery management unit (BMU).

The BMU is connected to the auxiliary power supply. The BMU is configured to detect an electrical signal of the auxiliary power supply, and when the electrical signal of the auxiliary power supply falls within a preset interval, control the auxiliary power supply to send the control signal to the first switch. The control signal is used to control the first switch to be turned on.

According to the foregoing structure of the energy storage apparatus, to safely supply power to the controller, the BMU is disposed in each battery module. The BMU may detect the electrical signal flowing through the auxiliary power supply, determine, based on whether the detected electrical signal falls within the preset interval, whether the current battery module is faulty, and supply power to the controller by using the battery module that is not faulty, thereby improving power supply safety.

In a possible design, the switch unit includes second switches in a one-to-one correspondence with the plurality of battery modules.

Each second switch is connected in series to a corresponding battery module.

According to the foregoing structure of the energy storage apparatus, a quantity of battery modules configured to supply power to the controller can be precisely controlled by controlling turn-on and turn-off of each second switch.

In a possible design, the second switch is bridged between two adjacent battery modules.

According to the foregoing structure of the energy storage apparatus, the plurality of battery modules may be connected in series through the corresponding second switches.

In a possible design, a first electrode of each second switch is connected to a first end of the electrical energy output port, a second electrode of each second switch is connected to a first end of the corresponding battery module, and a second end of the corresponding battery module is connected to a second end of the electrical energy output port.

According to the foregoing structure of the energy storage apparatus, the plurality of battery modules may be connected in parallel through the corresponding second switches.

In a possible design, the switch unit further includes third switches in a one-to-one correspondence with the second switches.

A first electrode of each third switch is connected to a first electrode of a corresponding second switch, and a second electrode of each third switch is connected to a second end of a battery module connected to the corresponding second switch.

According to the foregoing architecture of the energy storage apparatus, when detecting that an electrical signal of an auxiliary power supply in one or more battery modules falls outside the preset interval, the BMU determines that the battery module is faulty, and may control the third switch and the second switch to be turned on at the same time, to bypass the faulty battery module.

In a possible design, the switch unit further includes first diodes in a one-to-one correspondence with the second switches and second diodes in a one-to-one correspondence with the third switches.

The first diode is connected in parallel to a corresponding second switch. The second diode is connected in parallel to a corresponding third switch.

In a possible design, the start unit includes a first button switch.

The first button switch is connected in parallel to a first switch in any one of the plurality of battery modules.

In a possible design, the start unit includes second button switches in a one-to-one correspondence with the plurality of battery modules.

Each second button switch is connected in parallel to a first switch in a corresponding battery module.

According to a second aspect, an embodiment of this application provides a photovoltaic power generation system. The photovoltaic power generation system includes a plurality of photovoltaic modules, a DC/DC converter, a DC/AC converter, a controller, and the energy storage apparatus provided in the first aspect and any possible design of the first aspect in embodiments of this application.

The plurality of photovoltaic modules are connected to the DC/DC converter. The plurality of photovoltaic modules are configured to convert optical energy into a first direct current, and output the first direct current to the DC/DC converter. The DC/DC converter is separately connected to the DC/AC converter and the energy storage apparatus. The DC/DC converter is configured to convert the first direct current into a second direct current, and output the second direct current separately to the DC/AC converter and the energy storage apparatus. The energy storage apparatus is connected to the controller. The energy storage apparatus is configured to supply power to the controller. The DC/AC converter is configured to convert the second direct current into a first alternating current, and output the first alternating current. The controller is separately connected to the DC/DC converter and the DC/AC converter. The controller is configured to control working statuses of the DC/DC converter and the DC/AC converter.

According to the foregoing photovoltaic power generation system, when a power grid or an electrical device connected to the photovoltaic power generation system is disconnected due to a fault, the energy storage apparatus may supply power to the controller, so that the controller is powered on to resume power supply to the electrical device or the power grid, thereby implementing a black start of the photovoltaic power generation system without adding an additional component.

In a possible design, the controller is further configured to control a working status of the energy storage apparatus.

In a possible design, the photovoltaic power generation system further includes an energy storage converter connected between the DC/DC converter and the energy storage apparatus.

According to a third aspect, an embodiment of this application provides a control method of an energy storage apparatus. The control method may be applied to an energy storage apparatus connected to a controller. The energy storage apparatus may include a plurality of battery modules, a start unit connected to the battery modules, an electrical energy output port, and a switch unit separately connected to the battery modules and the electrical energy output port. The control method is executed by the plurality of battery modules of the energy storage apparatus.

Specifically, the control method includes the following steps, including when determining that the start unit receives a start signal, the plurality of battery modules control the switch unit to be turned on. The plurality of battery modules output stored electrical energy to a controller through the electrical energy output port.

According to the foregoing method, when an electrical device or a power grid connected to the photovoltaic power generation system is powered off, the switch unit may be controlled to be turned on, and an electrical energy transmission path is formed for the controller and the plurality of battery modules, so that power is supplied to the controller by using the electrical energy stored in the plurality of battery modules. After being powered on, the controller may control the photovoltaic power generation system to be connected to the electrical device or the power grid. Electrical energy generated by the photovoltaic power generation system is supplied to the electrical device or the power grid. In this way, a black start is implemented without adding an additional component.

In a possible design, if the switch unit includes first switches in a one-to-one correspondence with the plurality of battery modules, and each first switch is connected in series to a corresponding battery module, that the plurality of battery modules control the switch unit to be turned on includes sending a first control signal to each first switch. The first control signal is used to control the first switch to be turned on.

According to the foregoing method, a control signal may be sent to the first switch that is in the switch unit and that is connected to the battery module, to form an electrical energy transmission path of the battery module.

In a possible design, the sending a first control signal to each first switch includes detecting an electrical signal on each battery module; and when it is determined that the electrical signal falls within a preset interval, sending the first control signal to each first switch.

According to the foregoing method, whether a current battery module is faulty is determined by detecting an electrical signal on the battery module. When it is determined that the battery module is not faulty, a first switch connected to the battery module is controlled to be turned on, and electrical energy stored in the battery module is output to the controller.

In a possible design, the switch unit further includes second switches in a one-to-one correspondence with the first switches. A first electrode of each second switch is connected to a first electrode of a corresponding second switch, and a second electrode of each second switch is connected to a second end of a battery module connected to the corresponding first switch. The method further includes when it is determined that an electrical signal on a target battery module falls outside the preset interval, sending a second control signal to a second switch connected to the target battery module. The second control signal is used to control, to be turned on, the second switch connected to the target battery module.

According to the foregoing method, when it is determined that the electrical signal on the target battery module falls outside the preset interval, it may be determined that the target battery module is faulty. In this case, the second switch connected to the target battery module may be controlled to be turned on. Because a branch formed by the target battery module and the first switch that are connected in series is connected in parallel to the second switch, the target battery module can be effectively bypassed when the second switch is turned on. In this case, the faulty battery module does not transmit electrical energy.

DETAILED DESCRIPTION OF ILLUSTRATIVE EMBODIMENTS

The following describes in detail embodiments of this application with reference to accompanying drawings.

To make the objectives, technical solutions, and advantages of this application clearer, the following further describes this application in detail with reference to the accompanying drawings. A specific operation method in a method embodiment may also be applied to an apparatus embodiment or a system embodiment. It should be noted that "a plurality of" in description of this application means two or more. In view of this, in embodiments of the present invention, "a plurality of" may also be understood as "at least two". In addition, it should be understood that in the description of this application, terms such as "first" and "second" are merely used for distinguishing and description, but should not be understood as indicating or implying relative importance, or should not be understood as indicating or implying a sequence.

It should be noted that a "connection" in embodiments of this application means an electrical connection, and a connection between two electrical elements may be a direct connection or an indirect connection between the two electrical elements. For example, a connection between A and B may represent that A and B are directly connected to each other, or A and B are indirectly connected to each other through one or more other electrical elements. For example, the connection between A and B may also represent that A is directly connected to C, C is directly connected to B, and A and B are connected to each other through C.

It should be noted that a switch in this embodiment of this application may be one or more of a plurality of types of switch devices such as a relay, a metal-oxide semiconductor field-effect transistor (MOSFET), a bipolar junction transistor (BJT), an insulated gate bipolar transistor (IGBT), and a silicon carbide (SiC) power transistor. This is not listed one by one in embodiment of this application. Each switch device may include a first electrode, a second electrode, and a control electrode. The control electrode is configured to control turn-on or turn-off of a switch. When the switch is turned on, a current can be transmitted between a first electrode and a second electrode of the switch. When the switch is turned off, a current cannot be transmitted between the first electrode and the second electrode of the switch. The MOSFET is used as an example. A control electrode of the switch is a gate. The first electrode of the switch may be a source of the switch device, and the second electrode may be a drain of the switch device. Alternatively, the first electrode may be a drain of the switch, and the second electrode may be a source of the switch.

Figure 1:
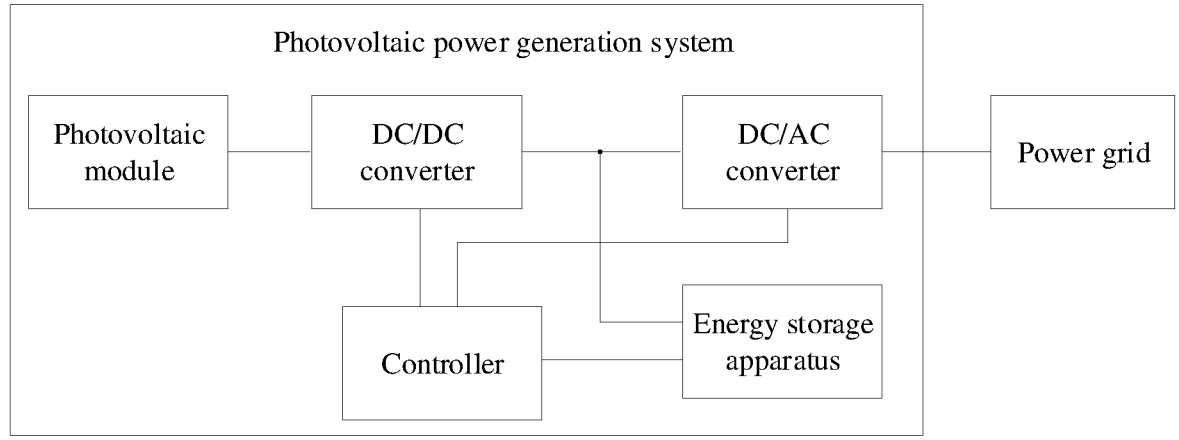
FIG. 1 is a schematic diagram 1 of a structure of a photovoltaic power generation system according to an embodiment of this application.

The energy storage apparatus provided in embodiments of this application may be used in a photovoltaic power generation system. FIG. 1 is a schematic diagram of a structure of a photovoltaic power generation system according to an embodiment of this application. As shown in FIG. 1, the photovoltaic power generation system mainly includes a plurality of photovoltaic modules, a direct current-to-direct current (DC/DC) converter, a direct current-to-alternating current (DC/AC) converter, an energy storage apparatus, and a controller.

In actual use, the photovoltaic power generation system may be connected to a power grid, to connect generated electrical energy to the power grid, or the photovoltaic power generation system may be directly connected to an electrical device, to directly provide generated electrical energy for the electrical device.

The plurality of photovoltaic modules are connected to the DC/DC converter. The plurality of photovoltaic modules may convert optical energy into a first direct current, and output the first direct current to the DC/DC converter. The DC/DC converter is connected to the DC/AC converter and the energy storage apparatus. The DC/DC converter may convert the received first direct current into a second direct current. The energy storage apparatus is connected to the DC/AC converter. When electrical energy output by the DC/DC converter exceeds an electrical energy requirement of the power grid or the electrical device, the energy storage apparatus may store surplus electrical energy. When electrical energy output by the DC/DC converter is less than the electrical energy requirement, the energy storage apparatus may output stored electrical energy to the power grid or the electrical device by using the DC/AC converter. The DC/AC converter is connected to the power grid or the electrical device. The DC/AC converter may convert a received direct current into an alternating current, and output the alternating current to the power grid or the electrical device. The controller is separately connected to the DC/DC converter, the DC/AC converter, and the energy storage apparatus. The controller may be configured to control the DC/DC converter to convert the first direct current into the second direct current, control the DC/AC converter to convert the received direct current into the alternating current, and control the energy storage apparatus to store the electrical energy and release the stored electrical energy.

It should be understood that a connection relationship between the photovoltaic power generation system and the power grid in FIG. 1 is a simplified example. In specific implementation, another power grid device may be further connected between the photovoltaic power generation system and the power grid or the electrical device. For example, a transformer may be further connected between the photovoltaic power generation system and the power grid, and the transformer boosts an alternating current provided by the photovoltaic power generation system to implement high-voltage transmission and the like. Such a conventional technology in the art is not limited in this application.

In a possible implementation, a voltage fluctuation of a direct current output by the DC/DC converter is relatively large, and it is also difficult for a voltage value of the output direct current to meet a voltage requirement of the energy storage apparatus. Therefore, an energy storage converter may be further connected between the energy storage apparatus and the DC/DC converter. The energy storage converter may perform rectification and voltage regulation on the second direct current output by the DC/DC converter, to output a direct current voltage available to the energy storage apparatus.

In actual application, the power grid supplies power to the controller. When the connected power grid or the connected electrical device is powered off due to a fault of the power grid or the electrical device or due to a reason such as periodic maintenance, a fault detection apparatus of the photovoltaic power generation system directly determines a fault by default, and disconnects the photovoltaic power generation system from the power grid or the electrical device. After the fault of the electrical device or the power grid is removed, the connection between the photovoltaic power generation system and the power grid or the electrical device needs to be resumed, so that the photovoltaic power generation system supplies power to the electrical device or the power grid again, that is, a black start.

Figure 2:
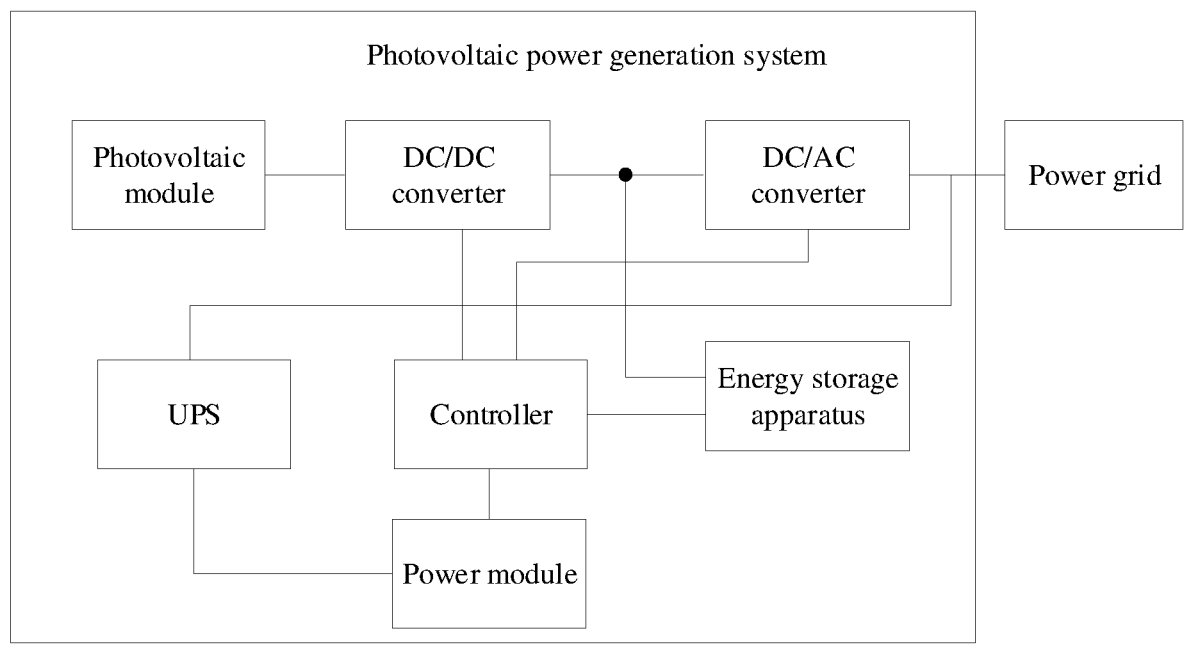
FIG. 2 is a schematic diagram 2 of a structure of a photovoltaic power generation system according to an embodiment of this application.

Currently, a common black start manner is to set an uninterruptible power supply (UPS) in a photovoltaic power generation system. With reference to FIG. 2, the UPS is separately connected to the power grid and the controller, and is configured to before the power grid or the electrical device is powered off, store electrical energy transmitted on the power grid, and when the power grid or the electrical device is powered off, provide stored electrical energy for the controller. After being powered on, the controller resumes the connection between the photovoltaic power generation system and the power grid or the electrical device, and controls each component in the photovoltaic power generation system to work normally and provide the generated electrical energy for the power grid or the electrical device again, to implement the black start.

In actual use, the photovoltaic power generation system further includes a power module connected to the controller and the UPS. The UPS may supply power to the controller by using the power module.

When the foregoing black start manner is actually used, the new component UPS needs to be added to the photovoltaic power generation system, thereby increasing a volume and costs of the photovoltaic power generation system. Because a use frequency of electrical energy stored in the UPS is not high, electrical energy utilization is reduced.

In view of this, this application provides a control method of an energy storage apparatus, an energy storage apparatus, and a photovoltaic power generation system. The energy storage apparatus may be used in the structure of the photovoltaic power generation system shown in FIG. 1. The energy storage apparatus is connected to the controller. When the power grid or the electrical device connected to the photovoltaic power generation system is powered off, the energy storage apparatus supplies power to the controller to implement a black start, thereby reducing costs of the photovoltaic power generation system and improving electrical energy utilization.

Figure 3:
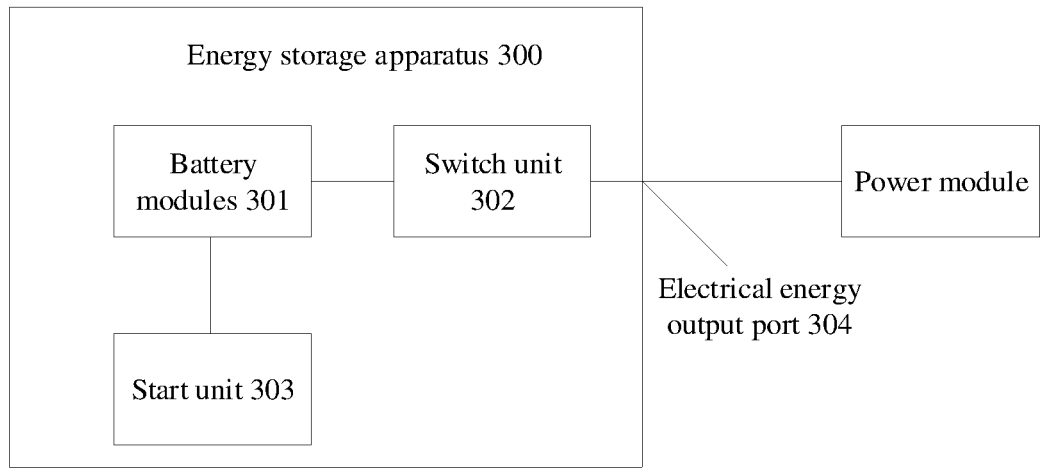
FIG. 3 is a schematic diagram 1 of a structure of an energy storage apparatus according to an embodiment of this application.

As shown in FIG. 3, an embodiment of this application provides an energy storage apparatus 300. With reference to FIG. 3, the energy storage apparatus 300 mainly includes a plurality of battery modules 301, a switch unit 302, a start unit 303, and an electrical energy output port 304.

The plurality of battery modules 301 are separately connected to the start unit 303 and the switch unit 302. The plurality of battery modules 301 are configured to when the start unit 303 receives a start signal, control the switch unit 302 to be turned on. The switch unit 302 is connected to the electrical energy output port. When the switch unit 302 is turned on, electrical energy stored in the plurality of battery modules 301 is output through the electrical energy output port. When the switch unit 302 is turned off, the plurality of battery modules 301 are disconnected from the electrical energy output port 304.

When power is supplied to the controller by using the energy storage apparatus 300 provided in this embodiment of this application to implement a black start, and the power grid or the electrical device connected to the photovoltaic power generation system works normally, the switch unit 302 is normally turned on, and the controller may control the plurality of battery modules 301 to store the second direct current output by the DC/DC converter, or may control the plurality of battery modules 301 to output the stored electrical energy to the DC/AC converter. In other words, the controller can normally control the energy storage apparatus 300 to store and release electrical energy. When the power grid or the electrical device connected to the photovoltaic power generation system is disconnected due to a fault, and a fault of the power grid or the electrical device is removed, an operator may control the start unit 303 to output the start signal. After receiving the start signal, the plurality of battery modules 301 control the switch unit 302 to be turned on. In this case, a conduction path is formed for the electrical energy output port 304 and the plurality of battery modules 301. In this case, the electrical energy stored in the plurality of battery modules 301 can be output to the controller through the electrical energy output port 304. After being powered on, the controller controls the DC/AC converter to be connected to the power grid or the electrical device. The electrical energy generated by the plurality of photovoltaic modules is output to the electrical device or the power grid again. In this way, the black start is implemented without adding an additional component to the photovoltaic power generation system.

In a possible implementation, the electrical energy output port 304 of the energy storage apparatus 300 may be directly connected to the controller in the photovoltaic power generation system, and is configured to output the electrical energy stored in the plurality of battery modules 301 to the controller, to supply power to the controller.

In actual use, the photovoltaic power generation system includes the power module configured to supply power to the controller. The electrical energy output port 304 of the energy storage apparatus 300 is connected to the controller through the power module. The energy storage apparatus 300 supplies power to the controller by using the power module.

In a possible implementation, a voltage of a direct current output by the electrical energy output port 304 fluctuates greatly, and a value of the voltage of the output direct current cannot meet a voltage requirement of the power module. Therefore, a DC/DC conversion circuit may be further connected between the energy storage apparatus 300 and the power module. The DC/DC conversion circuit may perform rectification and voltage regulation on the direct current output by the electrical energy output port 304 of the energy storage apparatus 300, to output an available direct current voltage for the power module. The DC/DC conversion circuit may be a DC/DC converter in the photovoltaic power generation system, or may be an energy storage converter in the photovoltaic power generation system.

In actual application, the energy storage apparatus 300 may be fastened to the photovoltaic power generation system. In another implementation, the energy storage apparatus 300 may be flexibly disposed in a detachable form. To be specific, a fixed interface is disposed in the photovoltaic power generation system, and the energy storage apparatus 300 may be connected to the photovoltaic power generation system through the interface. In this case, the energy storage apparatus 300 may be considered as an apparatus independent of the photovoltaic power generation system.

The following describes specific structures of the plurality of battery modules 301, the switch unit 302, and the start unit 303 in the energy storage apparatus 300.

1. Battery Modules 301

The plurality of battery modules 301 are separately connected to the start unit 303 and the switch unit 302. The plurality of battery modules 301 may be configured to when it is determined that the start unit 303 receives a start signal, control the switch unit 302 to be turned on. A conduction path is formed for the electrical energy output port 304 and the plurality of battery modules 301. The plurality of battery modules 301 may output the stored electrical energy through the electrical energy output port 304.

Specifically, each of the plurality of battery modules 301 may include a battery pack, an auxiliary power supply, and a first switch.

A first end of the auxiliary power supply is connected to a first electrode of the first switch, and a second end of the auxiliary power supply is connected to a second end of the battery pack. The first electrode of the first switch is connected to the start unit 303, a second electrode of the first switch is separately connected to a first end of the battery pack and the start unit 303, and a control electrode of the first switch is connected to the auxiliary power supply. The first switch and the switch unit are coupled switches.

In a possible implementation, the auxiliary power supply may be connected to the control electrode of the first switch in each battery module.

It should be noted that the battery pack in the battery module may be a single battery, or may be a battery cluster including a plurality of batteries. In specific implementation, the battery may be one or a combination of a plurality of a lead carbon battery, a lithium iron phosphate battery, a ternary lithium battery, a sodium-sulfur battery, and a flow battery, and may be flexibly selected based on an actual application environment, a cost budget, and the like.

When power is supplied to the controller by using the foregoing battery module, and the start unit 303 receives the start signal, the conduction path is formed between the auxiliary power supply and the battery pack, and the auxiliary power supply is powered on and controls the first switch to be turned on. Because the first switch and the switch unit 302 are coupled switches, when the first switch is turned on, the switch unit 302 may be driven to be turned on, and a conduction path is formed between the battery pack and the electrical energy output port 304.

In a possible implementation, a control electrode of a switch in the switch unit 302 may be connected to the auxiliary power supply. After being powered on, the auxiliary power supply controls the switch unit 302 to be turned on.

In a possible implementation, each battery module further includes a battery management unit (BMU).

The BMU is connected to the auxiliary power supply. The BMU is configured to detect an electrical signal of the auxiliary power supply, and when it is determined that a value of the detected electrical signal falls within a preset interval, determine that the battery module is not faulty, and control the auxiliary power supply to send the control signal to the first switch. The control signal is used to control the first switch to be turned on. It should be noted that a value of the preset interval may be set based on a storage capacity of the battery pack.

In specific implementation, when the start unit 303 receives the start signal, the battery pack and the auxiliary power supply form a conduction path by using the start unit 303. In this case, an electrical signal exists in the path of the auxiliary power supply. The BMU detects the value of the electrical signal, determines that the battery module is normal when the value of the electrical signal falls within the preset interval, controls the auxiliary power supply to send the control signal to the first switch, and when the value of the electrical signal falls outside the preset interval, determines that the battery module is faulty.

In a possible implementation, the BMU may be further connected to the controller in the photovoltaic power generation system. To be specific, the BMU may communicate with the controller, and the controller may control a working status of each battery module by using the BMU in each battery module. For example, when the battery module does not need to store electrical energy or release electrical energy, the controller may control, by using the BMU, the auxiliary power supply to cancel sending the control signal to the first switch, and disconnect the battery pack from the auxiliary power supply, to avoid a case in which the auxiliary power supply consumes the electrical energy stored in the battery pack.

Figure 4:
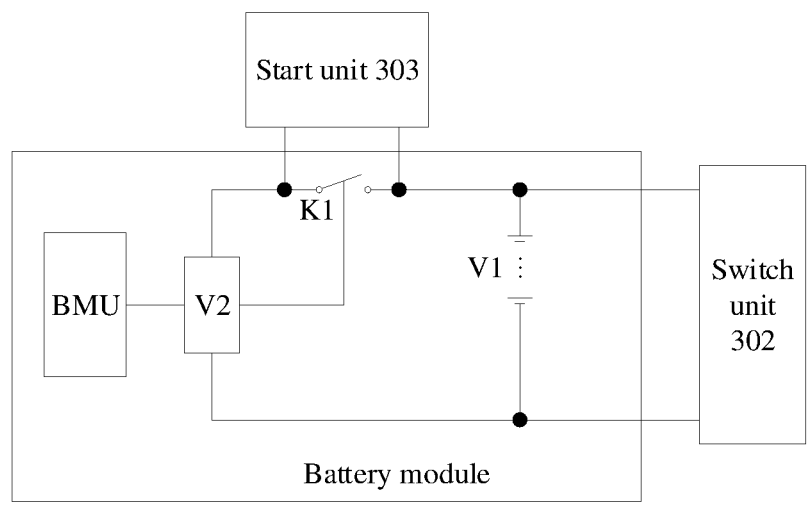
FIG. 4 is a schematic diagram of a structure of a battery module according to an embodiment of this application.

With reference to FIG. 4, description is provided below by using an example in which the battery pack is a battery cluster.

For ease of understanding, the following provides a specific example of a structure of a battery module.

FIG. 4 is a schematic diagram of a structure of a battery module according to an embodiment of this application. In FIG. 4, V1 represents the battery pack, V2 represents the auxiliary power supply, K1 represents the first switch, and a BMU is the battery management unit. Ports A and B are output ports of the battery module.

A connection relationship between components in the battery module shown in FIG. 4 may be as follows. V2 is connected to the BMU, a first end of V2 is connected to a first electrode of K1, a second end of V2 is connected to a second end of V1, a second electrode of K1 is connected to a first end of V1, a first electrode and a second electrode of K1 are separately connected to the start unit, and a control electrode of K1 is connected to V2.

When power is supplied to the controller by using the battery module shown in FIG. 4, and the start unit 303 receives the start signal, a conduction path is formed between V1 and V2 by using the start unit 303. In this case, V1 transmits electrical energy to V2, and the BMU detects an electrical signal on V2. When determining that a value of the detected electrical signal falls within a preset interval, the BMU controls V2 to send a control signal to the control electrode of K1, to control K1 to be turned on. The auxiliary power supply also sends, to the switch in the switch unit 302, the control signal used to enable the switch unit 302 to be turned on. The switch unit 302 is turned on. In this case, a path for transmitting electrical energy to the outside is formed for the battery module, to supply power to the controller by using the connected power module.

Certainly, the foregoing description of the structure of the battery module is merely an example. In actual application, the battery module may also use another structure based on different turn-on forms of the switch unit. For example, the first switch and the switch unit 302 may be coupled switches.

2. Switch Unit 302

The switch unit 302 is separately connected to the electrical energy output port 304 and the plurality of battery modules 301. When the switch unit 302 is turned on, the plurality of battery modules 301 and the electrical energy output port 304 form a closed path. The plurality of battery modules 301 may output the stored electrical energy to the controller through the electrical energy output port 304. When the switch unit 302 is turned off, the plurality of battery modules 301 are disconnected from the electrical energy output port 304.

Specifically, the switch unit 302 may include second switches in a one-to-one correspondence with the plurality of battery modules.

Functions of setting the plurality of second switches are by controlling states of the plurality of second switches, controlling whether each battery module releases the stored electrical energy. When the electrical energy stored in the plurality of battery modules is greater than a requirement of the controller for the electrical energy, to reduce a loss, electrical energy stored in some battery modules may be output to the controller through the electrical energy output port.

Specifically, each second switch is connected in series to a corresponding battery module.

In a possible implementation, if the plurality of battery modules 301 are connected in series through the plurality of second switches, each second switch is bridged between two adjacent battery modules.

In a possible implementation, if the plurality of battery modules 301 are connected in parallel through the plurality of second switches, a first electrode of each second switch is connected to a first end of the electrical energy output port, a second electrode of each second switch is connected to a first end of the corresponding battery module, and a second end of the corresponding battery module is connected to a second end of the electrical energy output port.

In a possible implementation, the switch unit 302 may further include third switches in a one-to-one correspondence with the second switches.

A first electrode of each third switch is connected to a first electrode of a corresponding second switch, and a second electrode of each third switch is connected to a second end of a battery module connected to the corresponding second switch.

In actual use, a control electrode of the third switch may be connected to an auxiliary power supply in the battery module connected to the corresponding second switch. When determining that a value of a detected electrical signal of the auxiliary power supply falls outside the preset interval, the BMU determines that the battery module is faulty, and may control the auxiliary power supply to send the control signal to the third switch, to control the third switch to be turned on. In this case, the battery module corresponding to the second switch is bypassed by using the third switch, and the battery module does not participate in outputting the electrical energy.

In a possible design, the switch unit further includes first diodes in a one-to-one correspondence with the second switches and second diodes in a one-to-one correspondence with the third switches.

The first diode is connected in parallel to a corresponding second switch. The second diode is connected in parallel to a corresponding third switch.

Specifically, an anode of each first diode is connected to a first electrode of a corresponding second switch, and a cathode of each first diode is connected to a second electrode of the corresponding second switch, and an anode of each third switch is connected to a second electrode of a corresponding third switch, and a cathode of each third switch is connected to a first electrode of the corresponding third switch.

For ease of understanding, the following provides specific examples of structures of the switch unit in a case in which the plurality of battery modules are connected in series through the switch unit and in a case in which the plurality of battery modules are connected in parallel through the switch unit.

Figure 5:
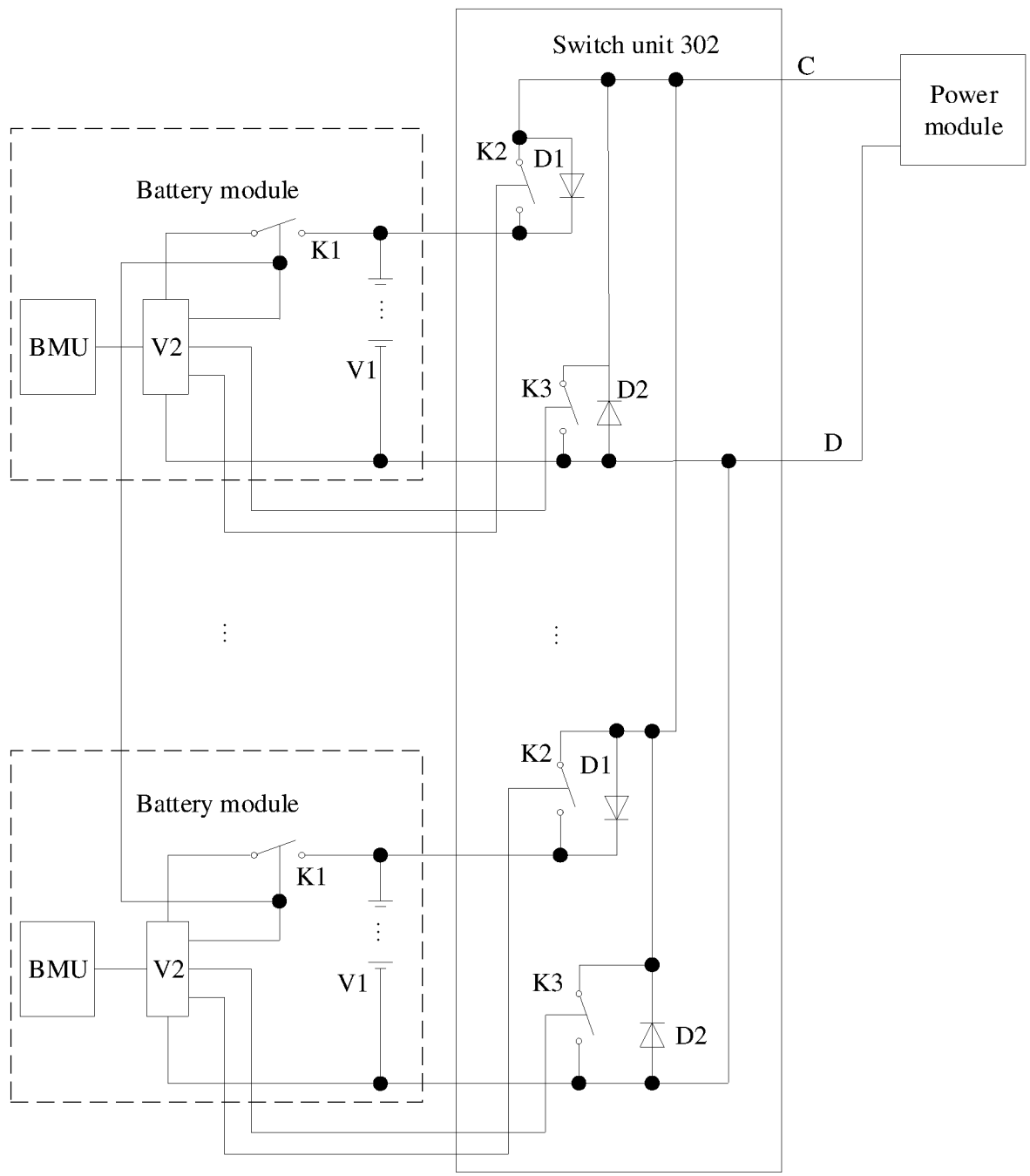
FIG. 5 is a schematic diagram 1 of a structure of a switch unit according to an embodiment of this application.

FIG. 5 is a schematic diagram of a structure of the switch unit 302 according to an embodiment of this application. In FIG. 5, K2 represents a second switch, K3 represents a third switch, D1 represents a first diode, D2 represents a second diode, and ends C and D are two ends of the electrical energy output port.

A connection relationship between components in the switch unit 302 shown in FIG. 5 may be as follows. A first electrode of K2 is separately connected to a first end C of the electrical energy output port, a first electrode of K3, and an anode of D1, and a second electrode of K2 is separately connected to a first end of a battery pack V1 in a corresponding battery module and a cathode of D1. The first electrode of K3 is connected to a cathode of D2, and a second electrode of K3 is separately connected to an anode of D2 and a second end of the battery pack V1 in the battery module corresponding to K2. Control electrodes of K2 and K3 are both connected to an auxiliary power supply V2 in the corresponding battery module.

When the electrical energy stored in the battery module is output to the electrical energy output port by using the switch unit 302 shown in FIG. 5, and the BMU in the battery module determines that the battery module is not faulty, the BMU in the battery module controls the auxiliary power supply to send a control signal to K2 to control K2 to be turned on. In this case, the plurality of battery modules are connected in parallel, and the electrical energy stored in each battery module is directly output, through two ends of the electrical energy output ports C and D, to the power module configured to supply power to the controller.

Figure 6:
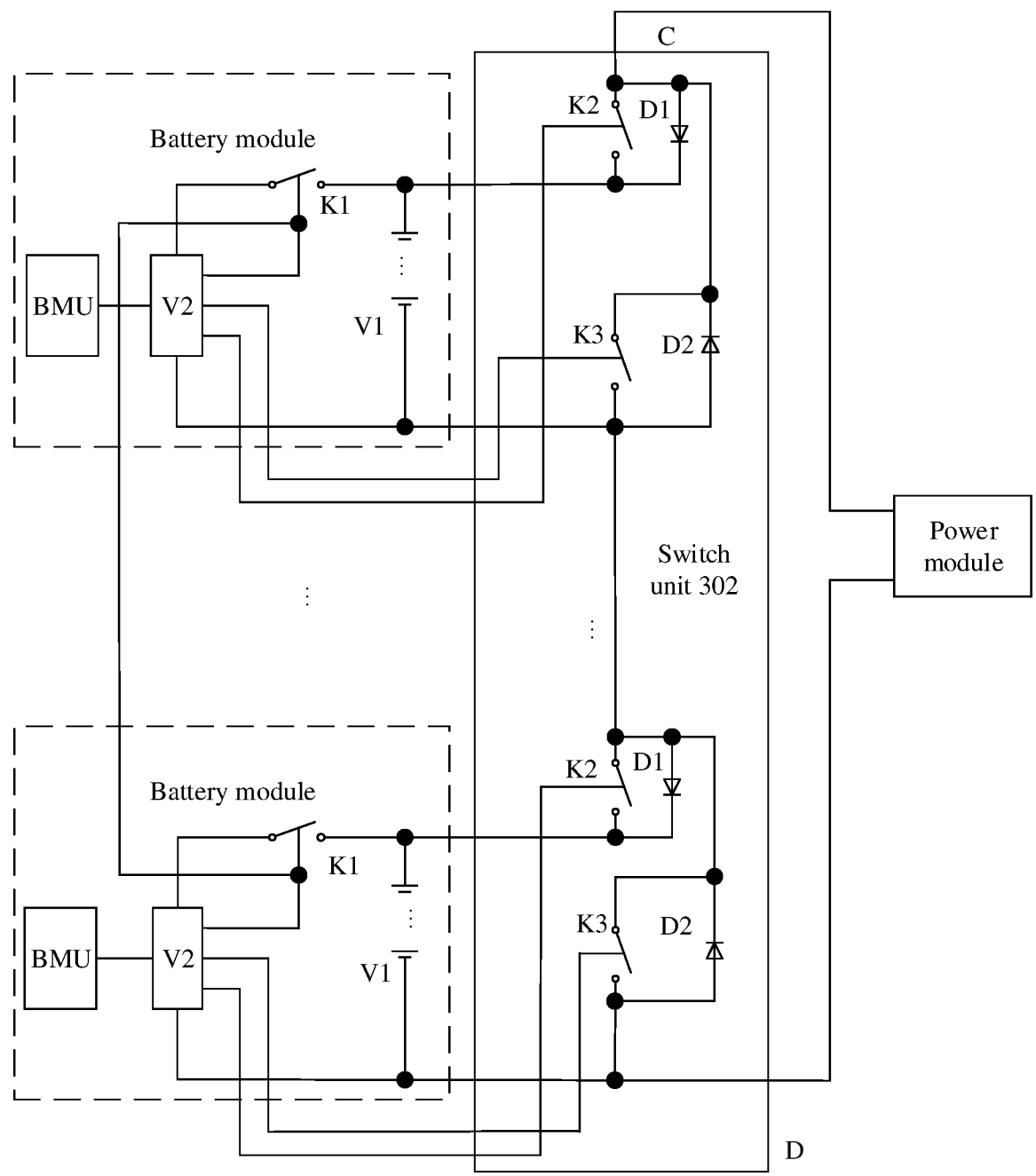
FIG. 6 is a schematic diagram 2 of a structure of a switch unit according to an embodiment of this application.

FIG. 6 is another schematic diagram of a structure of the switch unit 302 according to an embodiment of this application. In FIG. 6, K2 represents a second switch, K3 represents a third switch, D1 represents a first diode, D2 represents a second diode, and ports C and D are two ends of the electrical energy output ports.

A connection relationship between components in the switch unit 302 shown in FIG. 6 may be a first electrode of K2 is separately connected to a second end of a battery pack V1 in an adjacent battery module, a first electrode of K3, and an anode of D1, a second electrode of K2 is separately connected to a first end of a battery pack V1 in a corresponding battery module and a cathode of D1, a first electrode of K3 is connected to a cathode of D2, and a second electrode of K3 is separately connected to an anode of D2 and a second end of the battery pack V1 in the battery module corresponding to K2. Control electrodes of K2 and K3 are both connected to an auxiliary power supply V2 in the battery module corresponding to K2.

When the electrical energy stored in the battery module is output to the electrical energy output port by using the switch unit 302 shown in FIG. 6, and the BMU in the battery module determines that the battery module is not faulty, the BMU in the battery module controls the auxiliary power supply to send a control signal to K2 to send a control signal to control K2 to be turned on. In this case, the plurality of battery modules are connected in series, and the electrical energy stored in battery packs in the plurality of battery modules is added and then directly output, through two ends of the electrical energy output ports C and D, to the power module configured to supply power to the controller.

Certainly, the foregoing description of the structure of the battery module is merely an example. In actual application, the battery module may alternatively use another structure.

3. Start Unit 303

The start unit 303 is connected to the plurality of battery modules 301, and is configured to receive a start signal when a power grid or an electrical device is disconnected due to a fault, to form a conduction path between the auxiliary power supply in the battery module and the battery pack, so that the auxiliary power supply controls the switch unit to be turned on, thereby forming an electrical energy output path of the energy storage apparatus.

In a possible implementation, to reduce a volume and costs of the energy storage apparatus, the start unit includes a first button switch. The start signal is that pressing duration and a pressing pressure value are greater than preset touch signal thresholds.

The first button switch is connected in parallel to a first switch in any one of the plurality of battery modules 301.

In a possible implementation, the start unit includes second button switches in a one-to-one correspondence with the plurality of battery modules.

Each second button switch is connected in parallel to a first switch in a corresponding battery module.

In actual use, the plurality of second button switches may be adjacent to each other, or may be disposed at different locations. Because the auxiliary power supply in each battery module may send the control signal to any first switch, when any second button switch receives the start signal, the first switch in each battery module can receive the control signal and be turned on, and the auxiliary power supply is powered on and controls the switch unit to be turned on.

Certainly, the foregoing description of the structure of the start unit is merely an example. In actual application, the start unit may alternatively use another structure. For example, the switch in the start unit may be a knife switch.

Figure 7:
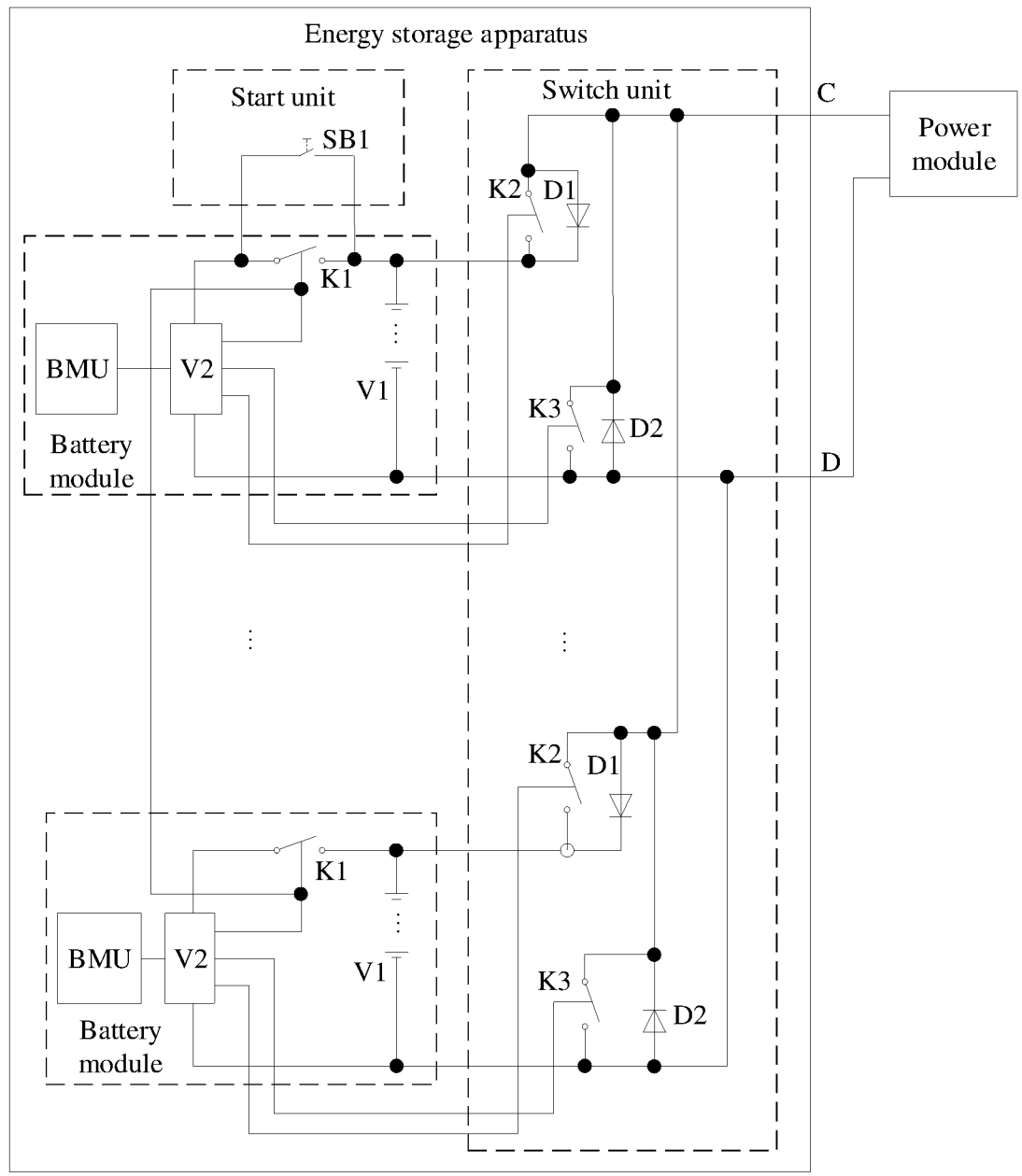
FIG. 7 is a schematic diagram 2 of a structure of an energy storage apparatus according to an embodiment of this application.

With reference to the foregoing description, for example, an energy storage apparatus provided in an embodiment of this application may be shown in FIG. 7.

In a plurality of battery modules, each battery module includes a switch K1, a battery pack V1, an auxiliary power supply V2, and a battery management unit BMU. A first end of V2 is connected to a first electrode of K1, and a second end of V2 is connected to a second end of V1. A second electrode of K1 is connected to a first end of V1. A second end of V1 is connected to a second end D of an electrical energy output port.

The switch unit includes switches K2 and K3, and diodes D1 and D2. A first electrode of K2 is separately connected to a first end C of the electrical energy output port, an anode of D1, and a first electrode of K3, and a second electrode of K2 is separately connected to a first end of V1, a first electrode of K3, and a cathode of D1. The first electrode of K3 is connected to a cathode of D2, and a second electrode of K3 is separately connected to an anode of D2 and the second end D of the electrical energy output port.

The start unit includes a first button switch SB1. Herein, SB1 may be connected in parallel to K1 in any battery module.

Power is supplied to a controller by using the energy storage apparatus shown in FIG. 7, to implement a black start. An operator may press the first button switch SB1, to connect V1 and V2 in the battery module in which K1 connected in parallel to SB1 is located. The BMU detects whether a value of an electrical signal on V2 falls within a preset interval. When the value of the electrical signal falls within the preset interval, the BMU controls V2 to send a control signal to K1 in each battery module, so that K1 in each battery module is turned on. In addition, the BMU controls V2 to send a control signal to corresponding connected K2 to turn on K2. In this case, electrical energy stored in battery packs in the battery modules can be output to the two ends of the electrical energy output ports C and D by using the connected Kis. The power module can be powered on through the two ends of the electrical energy output ports C and D, and then supply power to the controller. The controller performs control to implement the black start.

Figure 8:
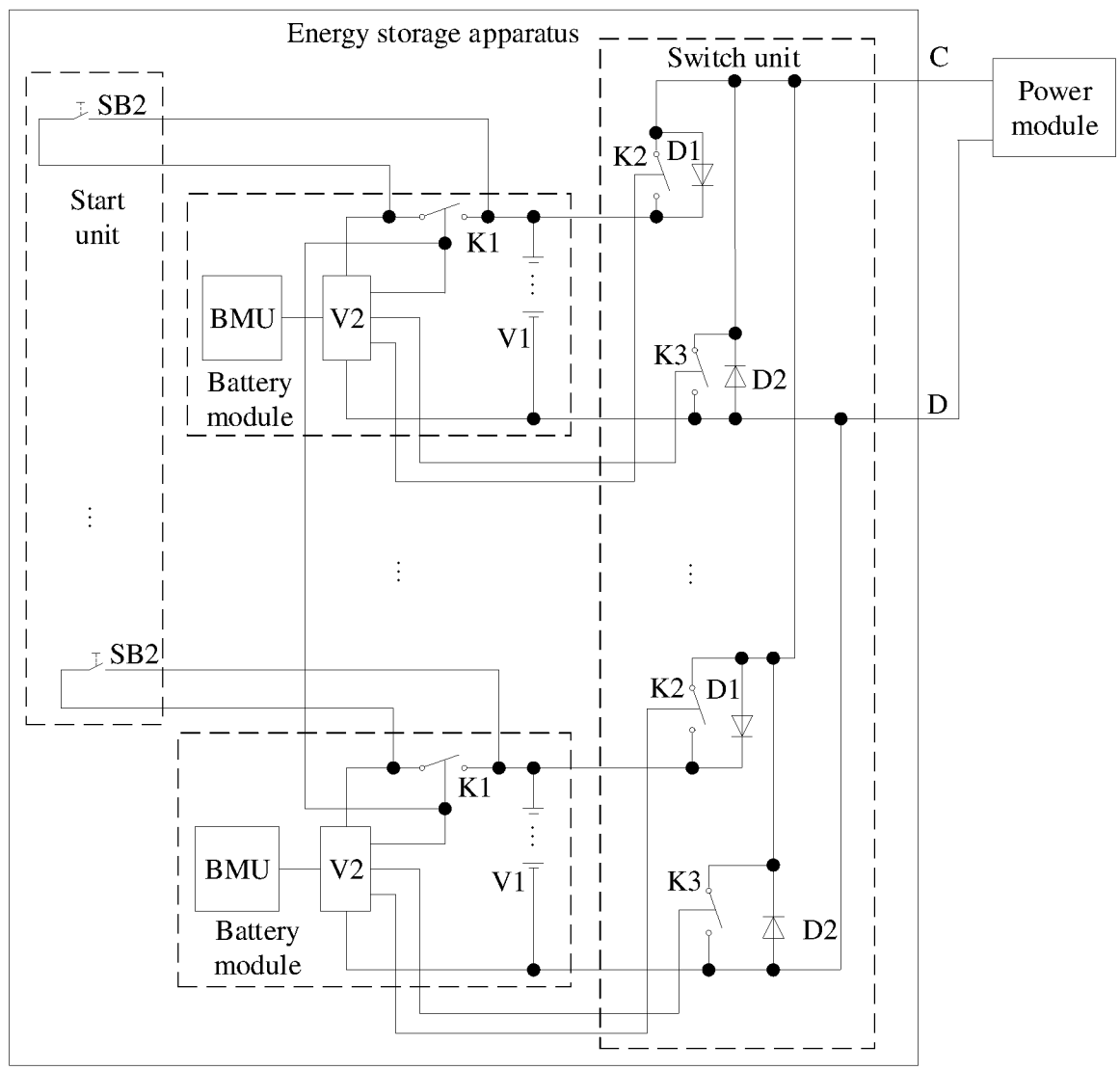
FIG. 8 is a schematic diagram 3 of a structure of an energy storage apparatus according to an embodiment of this application.

In a possible implementation, for ease of control, the start unit may include second button switches SB2s in a one-to-one correspondence with the plurality of battery modules. Specifically, with reference to FIG. 8, each second button switch is connected in parallel to a first switch in a corresponding battery module.

In actual use, the plurality of SB2s may be disposed at different locations. When any one of the plurality of SB2s receives a pressing signal, electrical energy stored in each battery module can be output to the controller.

Certainly, the foregoing description of the structure of the energy storage apparatus is merely an example. In actual application, the energy storage apparatus may alternatively use another structure based on different components in the battery module, the switch unit, and the start unit. Details are not described herein in this application.

Figure 9:
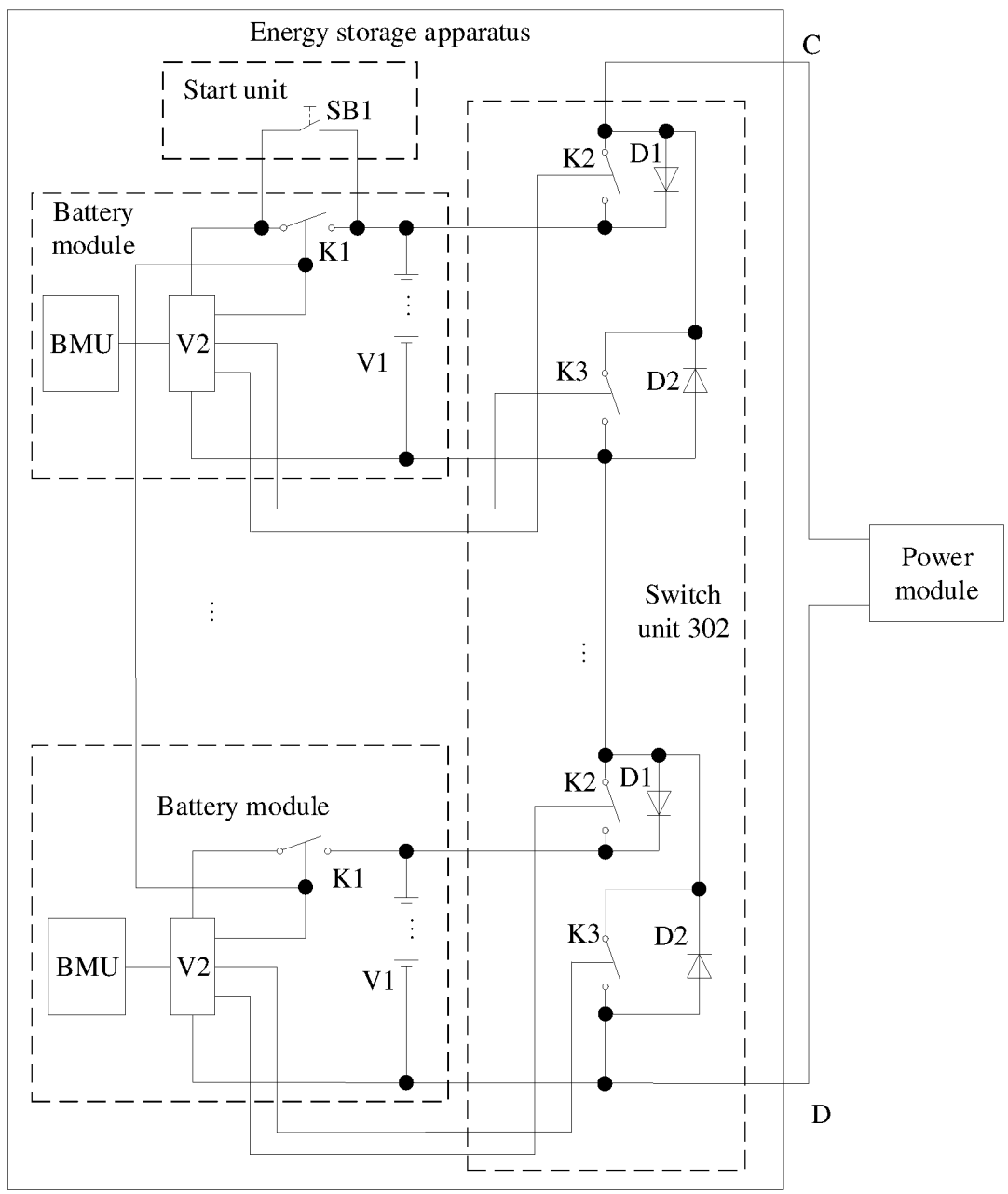
FIG. 9 is a schematic diagram 4 of a structure of an energy storage apparatus according to an embodiment of this application.

With reference to the foregoing description, for example, another energy storage apparatus provided in an embodiment of this application may be shown in FIG. 9.

In a plurality of battery modules, each battery module includes a switch K1, a battery pack V1, an auxiliary power supply V2, and a battery management unit BMU. A first end of V2 is connected to a first electrode of K1, and a second end of V2 is connected to a second end of V1. A second electrode of K1 is connected to a first end of V1. A second end of V1 is connected to a first electrode of K2 connected to an adjacent battery module.

The switch unit includes switches K2 and K3, and diodes D1 and D2. A first electrode of K2 is separately connected to a second end of V1, an anode of D1, and a first electrode of K3 in the adjacent battery module, and a second electrode of K2 is separately connected to a cathode of D1 and the first end of V1. The first electrode of K3 is connected to a cathode of D2, and a second electrode of K3 is separately connected to an anode of D2 and a second end of V1. Control electrodes of K2 and K3 are both connected to V2.

Power is supplied to a controller by using the energy storage apparatus shown in FIG. 9, to implement a black start. An operator may press a first button SB1, to connect V1 and V2 in the battery module in which K1 connected in parallel to SB1 is located. The BMU detects whether a value of an electrical signal on V2 falls within a preset interval. When the value of the electrical signal falls within the preset interval, the BMU controls V2 to send a control signal to K1 in each battery module, so that K1 in each battery module is turned on. In addition, the BMU controls V2 to send a control signal to corresponding connected K2 to turn on K2. In this case, electrical energy stored in battery packs in the battery modules can be added through connected K1s, and output through the two ends of the electrical energy output ports C and D. The power module can be powered on through the two ends of the electrical energy output ports C and D, and then supply power to the controller. The controller performs control to implement the black start.

Figure 10:
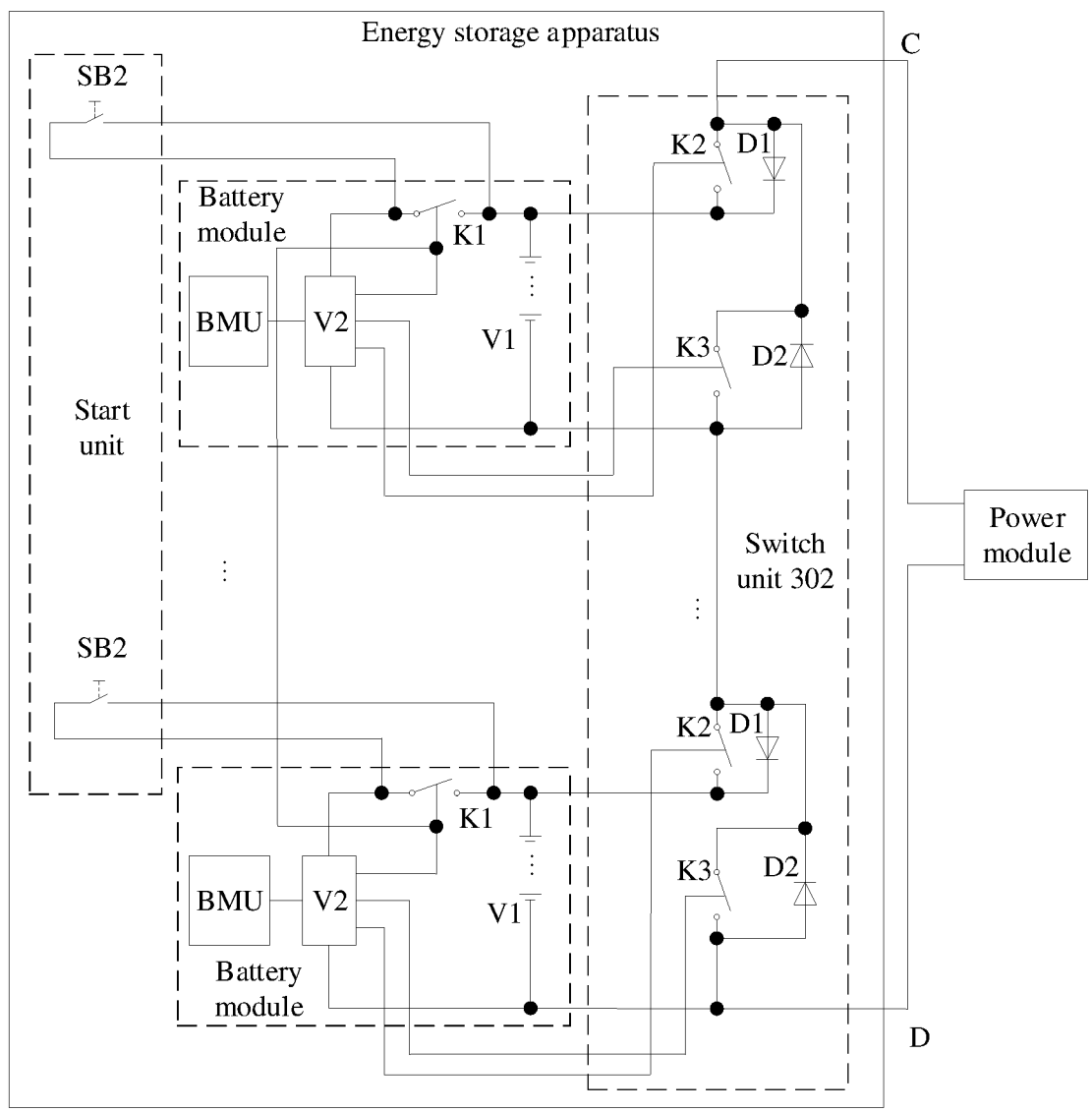
FIG. 10 is a schematic diagram 5 of a structure of an energy storage apparatus according to an embodiment of this application.

In a possible implementation, for ease of control, the start unit may include second button switches SB2s in a one-to-one correspondence with the plurality of battery modules. Specifically, with reference to FIG. 10, each second button switch is connected in parallel to a first switch in a corresponding battery module.

In actual use, the plurality of SB2s may be disposed at different locations. When any one of the plurality of SB2s receives a pressing signal, electrical energy stored in each battery module can be output to the controller.

Certainly, the foregoing description of the structure of the energy storage apparatus is merely an example. In actual application, the energy storage apparatus may alternatively use another structure based on different components in the battery module, the switch unit, and the start unit. Details are not described herein in this application.

Figure 11:
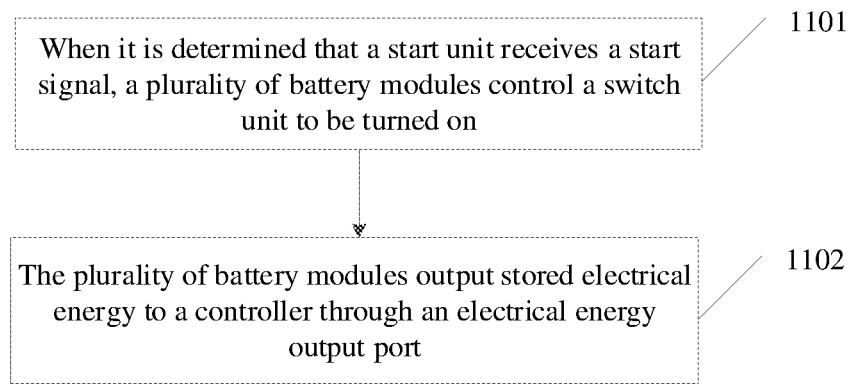
FIG. 11 is a schematic flowchart of a control method of an energy storage apparatus according to an embodiment of this application.

Specifically, for the structure of the energy storage apparatus shown in FIG. 3, the plurality of battery modules may perform a control method of an energy storage apparatus shown in FIG. 11 to control power supply to the controller. In this way, it is ensured that the controller is powered on and then controls running of a component in a photovoltaic power generation system, thereby implementing a black start. Specifically, the control method mainly includes the following steps.

S1101: When it is determined that a start unit receives a start signal, a plurality of battery modules control a switch unit to be turned on.

It should be understood that, because the switch unit is connected for an electrical energy output port and the plurality of battery modules, when the switch unit is turned on, the plurality of battery modules may be connected to the electrical energy output port.

In a possible design, if the switch unit includes first switches in a one-to-one correspondence with the plurality of battery modules, and each first switch is connected in series to a corresponding battery module, a first control signal is sent to each first switch. The first control signal is used to control the first switch to be turned on.

Specifically, after it is determined that the start unit receives the start signal and before the first control signal is sent to the first switch, an electrical signal on each battery module is detected, and when it is determined that the electrical signal on the battery module falls within a preset interval, it is determined that the battery module is not faulty, and the first control signal is sent to the first switch connected to the battery module.

In a possible design, if the switch unit further includes second switches in a one-to-one correspondence with the first switches, a first electrode of each second switch is connected to a first electrode of a corresponding first switch, and a second electrode of each second switch is connected to a second end of a battery module connected to the corresponding first switch. When it is determined that an electrical signal on a target battery module falls outside the preset interval, a second control signal is sent to a second switch connected to the target battery module. The second control signal is used to control, to be turned on, the second switch connected to the target battery module.

It should be understood that, when it is determined that the electrical signal on the target battery module falls outside the preset interval, it may be determined that the target battery module is faulty. To avoid a case in which a fault occurs when another battery is connected because the first switch connected to the target battery module is incorrectly turned on, the second switch may be controlled to be turned on, to bypass the target battery module.

S1102: The plurality of battery modules output stored electrical energy to a controller through the electrical energy output port.

It should be understood that, the switch unit is turned on to form an electrical energy transmission path for the electrical energy output port and the plurality of battery modules, and the plurality of battery modules may output, through the electrical energy transmission path, the stored electrical energy to the controller connected to the electrical energy output port, to supply power to the controller.

It can be learned from the foregoing embodiment that, based on the energy storage apparatus 300 provided in this embodiment of this application, when the controller is powered off because a power grid connected to the photovoltaic power generation system is powered off, the switch unit may be controlled to output the electrical energy stored in the plurality of battery modules to the controller. After being powered on, the controller controls components in the photovoltaic power generation system to run normally and output generated electrical energy to the power grid. In this way, the black start is implemented without adding an additional component.

It should be understood that, the foregoing energy storage apparatus and the control method of the energy storage apparatus may also be used in other fields. For example, in a power generation field in which a black start needs to be implemented, such as wind power generation, hydroelectric generation, and thermal power generation, the foregoing apparatus and method may be used to implement a black start, to reduce costs of a black start of a system.

Figure 12:
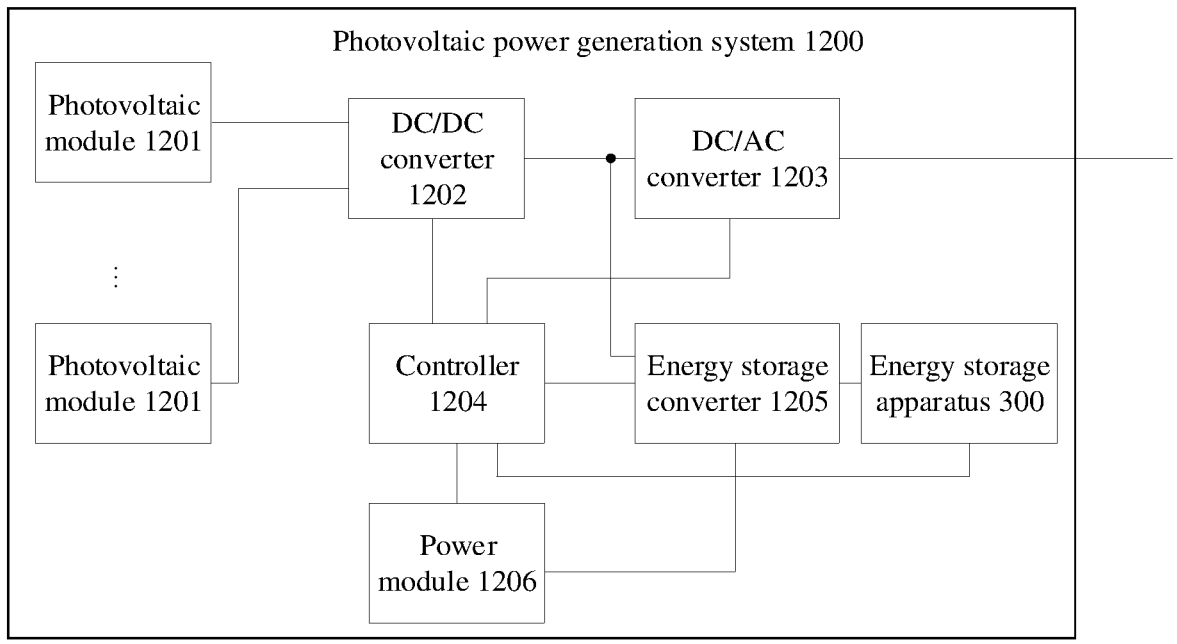
FIG. 12 is a schematic diagram 3 of a structure of a photovoltaic power generation system according to an embodiment of this application.

Based on a same inventive concept, an embodiment of this application further provides a photovoltaic power generation system. With reference to FIG. 12, the photovoltaic power generation system 1200 includes a plurality of photovoltaic modules 1201, a direct current-to-direct current DC/DC converter 1202, a direct current-to-alternating current DC/AC converter 1203, a controller 1204, and the foregoing energy storage apparatus 300.

The plurality of photovoltaic modules 1201 are connected to the DC/DC converter 1202. The plurality of photovoltaic modules 1201 are configured to convert optical energy into a first direct current, and output the first direct current to the DC/DC converter 1202. The DC/DC converter 1202 is separately connected to the DC/AC converter 1203 and the energy storage apparatus 300. The DC/DC converter 1202 is configured to convert the first direct current into a second direct current, and output the second direct current separately to the DC/AC converter 1203 and the energy storage apparatus 300. The energy storage apparatus 300 is connected to the controller 1204. The energy storage apparatus 300 is configured to supply power to the controller 1204. The DC/AC converter 1203 is configured to convert the second direct current into a first alternating current, and output the first alternating current. The controller 1204 is separately connected to the DC/DC converter 1202 and the DC/AC converter 1203. The controller 1204 is configured to control working statuses of the DC/DC converter 1202 and the DC/AC converter 1203.

In a possible implementation, the controller 1204 is further connected to the energy storage apparatus 300, and the controller 1204 is further configured to control a working status of the energy storage apparatus 300.

Optionally, the photovoltaic power generation system 1200 further includes an energy storage converter 1205 connected between the DC/DC converter 1202 and the energy storage apparatus 300. The energy storage converter may be configured to convert the second direct current output by the DC/DC converter 1202 into an available direct current for the energy storage apparatus 300.

In a possible implementation, the controller 1204 is connected to the energy storage converter 1205, and the controller 1204 may further control a working status of the energy storage converter 1205.

In a possible implementation, the energy storage converter 1205 may be connected to the controller 1204, and the energy storage converter may convert electrical energy output by the energy storage apparatus 300 into an available direct current for the controller 1204.

In actual use, the photovoltaic power generation system 1200 further includes a power module 1206 that is separately connected to the controller 1204 and the energy storage converter 1205, and the energy storage converter 1205 supplies power to the controller 1204 by using the power module 1206.

It should be understood that the apparatus provided in this application is not limited to the photovoltaic power generation field, but may also be applied to fields such as wind power generation and hydroelectric generation.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may be alternatively loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An energy storage apparatus, comprising:
a plurality of battery modules, each of the plurality of battery modules comprising a battery pack and an auxiliary power supply;
a switch unit;
a start unit; and
an electrical energy output port;
wherein each of the plurality of battery modules is separately connected to the start unit and separately directly connected to the switch unit, and wherein the plurality of battery modules are configured to, when the start unit receives a start signal, control the switch unit to be turned on;
wherein the switch unit is connected to the electrical energy output port; and
wherein the energy storage apparatus is configured to, in response to the switch unit being turned on, output electrical energy stored in the plurality of battery modules through the electrical energy output port, and wherein the energy storage apparatus is configured to, in response to the switch unit being turned off, disconnect the plurality of battery modules from the electrical energy output port.

2. The apparatus according to claim 1, wherein each of the plurality of battery modules further comprises a first switch;
wherein a first end of the auxiliary power supply is connected to a first electrode of the first switch, and a second end of the auxiliary power supply is connected to a second end of the battery pack; and
wherein the first electrode of the first switch is connected to the start unit, a second electrode of the first switch is separately connected to a first end of the battery pack and the start unit, a control electrode of the first switch is connected to the auxiliary power supply, and the first switch and the switch unit are coupled switches.

3. The apparatus according to claim 2, wherein each of battery module of the plurality of battery modules further comprises a battery management unit (BMU); and
wherein the BMU of each respective battery module is connected to the auxiliary power supply, and wherein the respective BMU is configured to detect an electrical signal of the auxiliary power supply, and in response to the electrical signal of the auxiliary power supply falling within a preset interval, control the auxiliary power supply to send a control signal to the first switch, wherein the control signal is associated with controlling the first switch to be turned on.

4. The apparatus according to claim 2, wherein the start unit comprises a first button switch; and
wherein the first button switch is connected in parallel to the first switch in at least one battery module of the plurality of battery modules.

5. The apparatus according to claim 2, wherein the start unit comprises second button switches in a one-to-one correspondence with the plurality of battery modules; and
wherein each second button switch of the second button switches is connected in parallel.

6. The apparatus according to claim 1, wherein the switch unit comprises second switches in a one-to-one correspondence with the plurality of battery modules; and
wherein each of the second switches is connected in series to a corresponding battery module of the plurality of battery modules.

7. The apparatus according to claim 6, wherein each of the second switches is bridged between two adjacent battery modules of the plurality of battery modules.

8. The apparatus according to claim 6, wherein a first electrode of each of the second switches is connected to a first end of the electrical energy output port, wherein a second electrode of each of the second switches is connected to a first end of the corresponding battery module, and wherein a second end of the corresponding battery module is connected to a second end of the electrical energy output port.

9. The apparatus according to claim 6, wherein the switch unit further comprises third switches in a one-to-one correspondence with the second switches; and
wherein a first electrode of each of the third switches is connected to a first electrode of a corresponding second switch of the second switches, and wherein a second electrode of each of the third switches is connected to a second end of a battery module connected to the corresponding second switch.

10. The apparatus according to claim 9, wherein the switch unit further comprises first diodes in a one-to-one correspondence with the second switches and further comprises second diodes in a one-to-one correspondence with the third switches;
wherein each first diode of the first diodes is connected in parallel to a corresponding second switch; and
wherein each second diode of the second diodes is connected in parallel to a corresponding third switch.

11. A photovoltaic power generation system, comprising:
a direct current-to-direct current (DC/DC) converter;
a direct current-to-alternating current (DC/AC) converter,
a controller, and
an energy storage apparatus comprising a plurality of battery modules, a switch unit, a start unit, and an electrical energy output port, each of the plurality of battery modules comprising a battery pack and an auxiliary power supply;
wherein each of the plurality of battery modules is separately connected to the start unit and separately directly connected to the switch unit, and wherein the plurality of battery modules are configured to, when the start unit receives a start signal, control the switch unit to be turned on;
wherein the switch unit is connected to the electrical energy output port;
wherein the energy storage apparatus is configured to, in response to the switch unit being turned on, output electrical energy stored in the plurality of battery modules through the electrical energy output port, and wherein the energy storage apparatus is configured to, in response to the switch unit being turned off, disconnect the plurality of battery modules from the electrical energy output port;
wherein a plurality of photovoltaic modules are connected to the DC/DC converter, and wherein each photovoltaic module of the plurality of photovoltaic modules is configured to convert optical energy into a first direct current, and to output the first direct current to the DC/DC converter;

wherein the DC/DC converter is separately connected to the DC/AC converter and the energy storage apparatus, and the DC/DC converter is configured to convert the first direct current into a second direct current, and to output the second direct current separately to the DC/AC converter and the energy storage apparatus;

wherein the energy storage apparatus is connected to the controller, and the energy storage apparatus is configured to supply power to the controller;

wherein the DC/AC converter is configured to convert the second direct current into a first alternating current, and to output the first alternating current; and wherein the controller is separately connected to the DC/DC converter and the DC/AC converter, and wherein the controller is configured to control working statuses of the DC/DC converter and the DC/AC converter.

12. The system according to claim 11, wherein the controller is further configured to control a working status of the energy storage apparatus.

13. The system according to claim 11, wherein the photovoltaic power generation system further comprises an energy storage converter connected between the DC/DC converter and the energy storage apparatus.

14. A control method, comprising:
performing, by an energy storage apparatus connected to a controller and comprising a plurality of battery modules, each of the plurality of battery modules comprising a battery pack and an auxiliary power supply, a start unit connected to the plurality of battery modules, an electrical energy output port, and a switch unit separately directly connected to each of the plurality of battery modules and the electrical energy output port:
controlling, by the plurality of battery modules, in response to determining that the start unit receives a start signal, the switch unit to be turned on; and
outputting, by the plurality of battery modules, stored electrical energy to the controller through the electrical energy output port.

15. The method according to claim 14, wherein the switch unit comprises first switches in a one-to-one correspondence with the plurality of battery modules, and wherein each of the first switches is connected in series to a corresponding battery module; and
wherein the controlling, by the plurality of battery modules, the switch unit to be turned on comprises:
sending a first control signal to each of the first switches, wherein the first control signal controls the respective first switch to be turned on.

16. The method according to claim 15, wherein the sending the first control signal to each of the first switches comprises:
detecting an electrical signal on each battery module of the plurality of battery modules; and
sending, in response to determining that the electrical signal falls within a preset interval, the first control signal to each of the first switches.

17. The method according to claim 16, wherein the electrical signal is an electrical signal of an auxiliary power unit.

18. The method according to claim 16, wherein the switch unit further comprises second switches in a one-to-one correspondence with the first switches, wherein a first electrode of each of the second switches is connected to a first electrode of a corresponding first switch, and wherein a second electrode of each of the second switches is connected to a second end of a corresponding battery module connected to the corresponding first switch; and
wherein the method further comprises:
sending, in response to determining that an electrical signal on a target battery module of the plurality of battery modules falls outside the preset interval, a second control signal to a second switch connected to the target battery module, wherein the second control signal controls turning on and off the second switch connected to the target battery module.

19. The method according to claim 14, wherein outputting the stored electrical energy to the controller through the electrical energy output port comprises outputting, by the plurality of battery modules, the stored electrical energy to the controller through the electrical energy output port in response to the switch unit being turned on.

20. The method according to claim 14, further comprising disconnecting, in response to the switch unit being turned off, the plurality of battery modules from the electrical energy output port.

* * * * *